(12) United States Patent
Kimura et al.

(10) Patent No.: US 10,719,121 B2
(45) Date of Patent: Jul. 21, 2020

(54) INFORMATION PROCESSING APPARATUS AND INFORMATION PROCESSING METHOD

(71) Applicant: SONY CORPORATION, Tokyo (JP)

(72) Inventors: Kentaro Kimura, Tokyo (JP); Takuo Ikeda, Tokyo (JP); Tetsuo Ikeda, Tokyo (JP); Tsubasa Tsukahara, Tokyo (JP); Yasuyuki Koga, Kanagawa (JP); Atsushi Izumihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 524 days.

(21) Appl. No.: 14/772,046

(22) PCT Filed: Jan. 20, 2014

(86) PCT No.: PCT/JP2014/000245
§ 371 (c)(1),
(2) Date: Sep. 1, 2015

(87) PCT Pub. No.: WO2014/136373
PCT Pub. Date: Sep. 12, 2014

(65) Prior Publication Data
US 2016/0018885 A1    Jan. 21, 2016

(30) Foreign Application Priority Data

Mar. 8, 2013    (JP) .............................. 2013-046902

(51) Int. Cl.
*G06F 3/00* (2006.01)
*G06F 3/01* (2006.01)
(Continued)

(52) U.S. Cl.
CPC ........... *G06F 3/005* (2013.01); *G02B 27/017* (2013.01); *G06F 3/011* (2013.01); *G06F 3/013* (2013.01);
(Continued)

(58) Field of Classification Search
CPC ...... G06F 3/005; G06F 3/011; G06F 3/04842; G06F 3/017; G06F 3/013;
(Continued)

(56) References Cited

U.S. PATENT DOCUMENTS 8,321,799 B1 * 11/2012 Simonson ............. G06F 3/0482
715/764
2002/0138346 A1 * 9/2002 Kodaka .................. G06Q 30/02
705/14.35
(Continued)

*Primary Examiner* — Amit Chatly
(74) *Attorney, Agent, or Firm* — Chip Law Group

(57) ABSTRACT

An information processing apparatus includes circuitry configured to provide a user interface to a user, determine whether a predetermined object is present in an input recognition area of a sensor, and determine a region of interest within the user interface. The circuitry is further configured to determine, while the predetermined object is determined to be present in the input recognition area, whether the region of interest within the user interface changes. The circuitry is further configured to perform an operation based on whether the region of interest is determined, while the predetermined object is determined to be present in the input recognition area, to change.

17 Claims, 11 Drawing Sheets

(51) Int. Cl.
*G06F 3/0484* (2013.01)
*G06T 7/70* (2017.01)
*G02B 27/01* (2006.01)
*G06K 9/00* (2006.01)

(52) U.S. Cl.
CPC .......... *G06F 3/017* (2013.01); *G06F 3/04842* (2013.01); *G06K 9/00355* (2013.01); *G06K 9/00375* (2013.01); *G06T 7/70* (2017.01); *G06F 2203/0381* (2013.01)

(58) Field of Classification Search
CPC .............. G06F 2203/0381; G06T 7/70; G06K 9/00375; G06K 9/00355; G02B 27/017
USPC .................................. 345/156–179
See application file for complete search history.

(56) References Cited

U.S. PATENT DOCUMENTS

| | | | | |
|---|---|---|---|---|
| 2005/0271279 | A1* | 12/2005 | Fujimura | G06K 9/00355 382/203 |
| 2007/0124503 | A1* | 5/2007 | Ramos | G06F 3/017 709/248 |
| 2012/0030632 | A1* | 2/2012 | McRae | G06F 3/017 715/863 |
| 2012/0069055 | A1* | 3/2012 | Otsuki | G06F 3/017 345/681 |
| 2012/0200499 | A1* | 8/2012 | Osterhout | G02B 27/0093 345/158 |
| 2013/0207896 | A1* | 8/2013 | Robinson | G06F 3/04815 345/158 |
| 2014/0092014 | A1* | 4/2014 | Srinivasan | G06F 3/013 345/158 |

* cited by examiner

[Fig. 1]
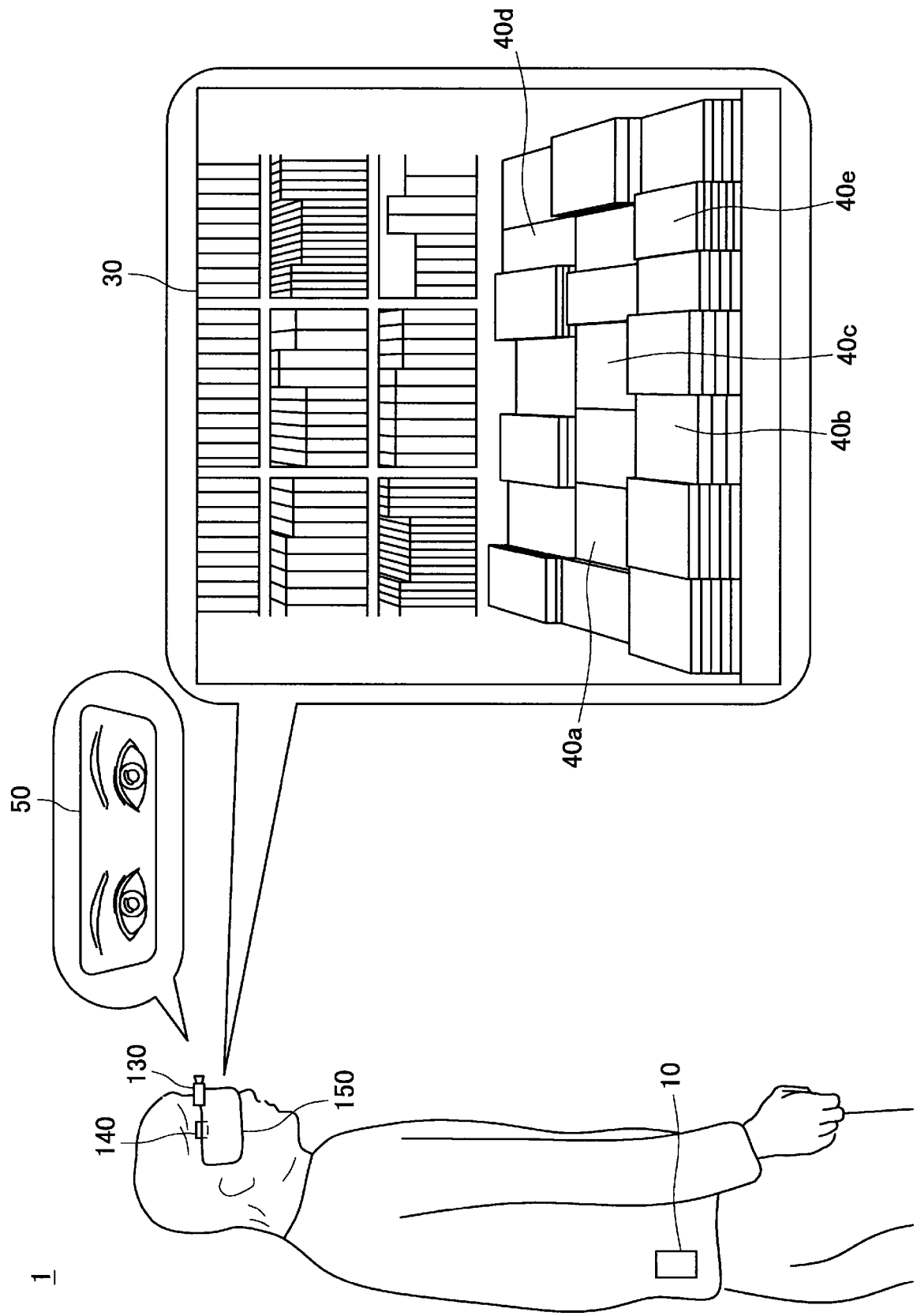

[Fig. 2]
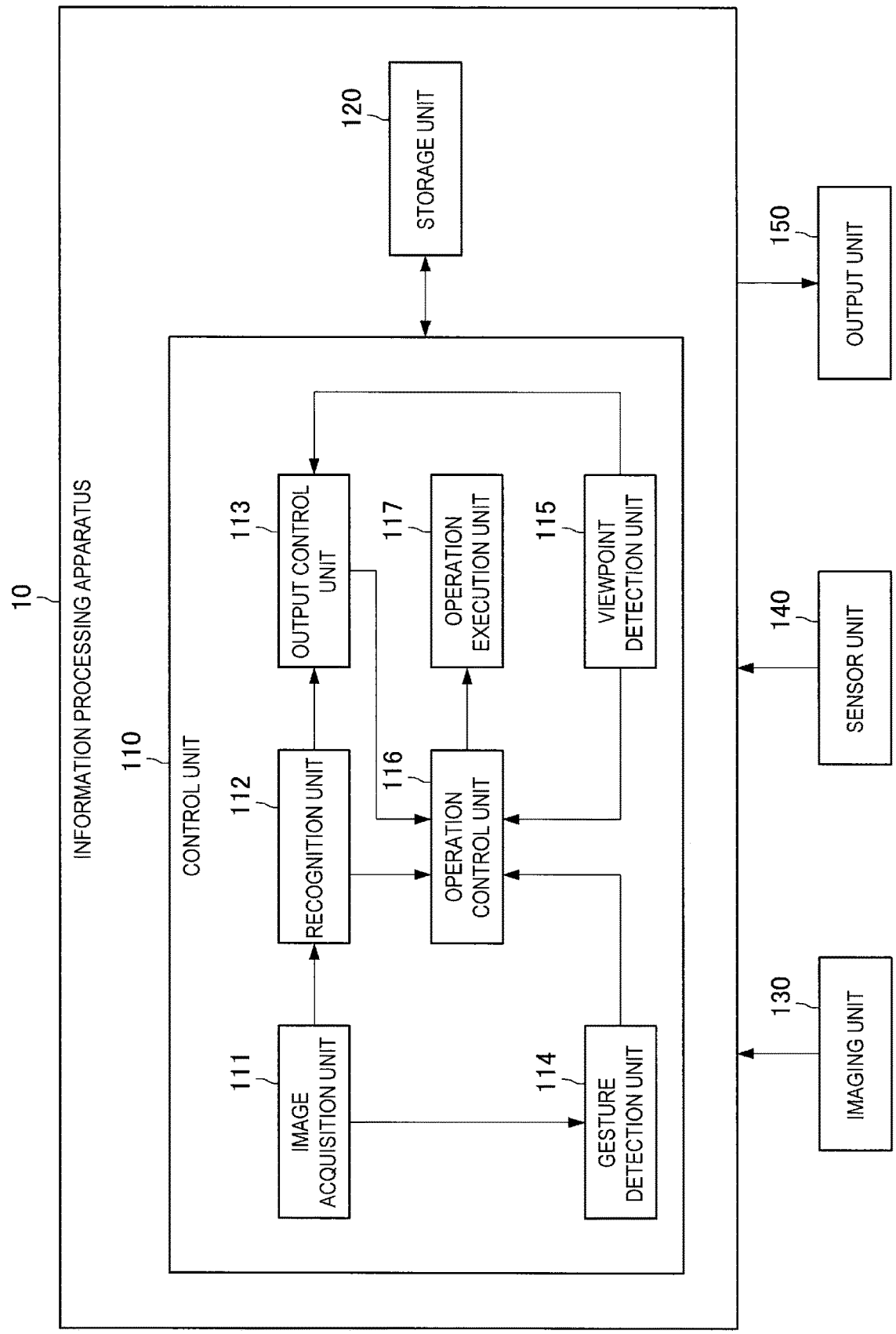

[Fig. 3]
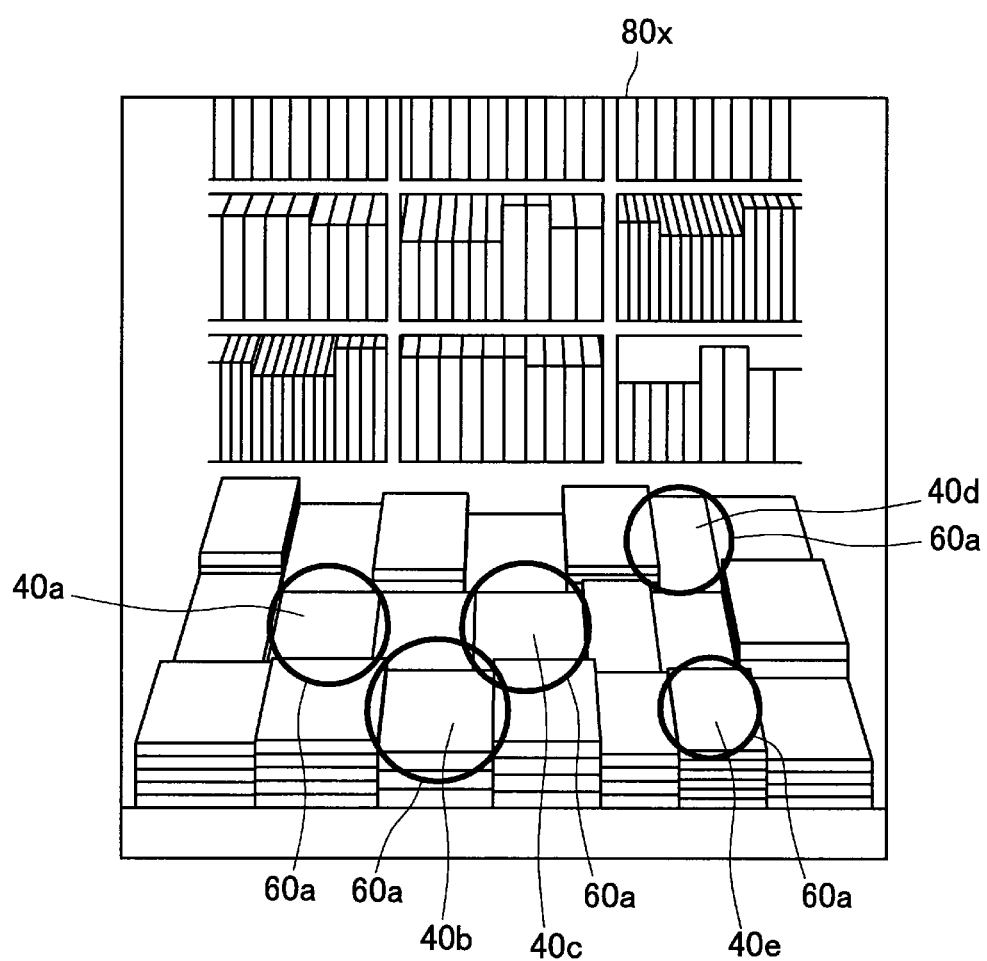

[Fig. 4]
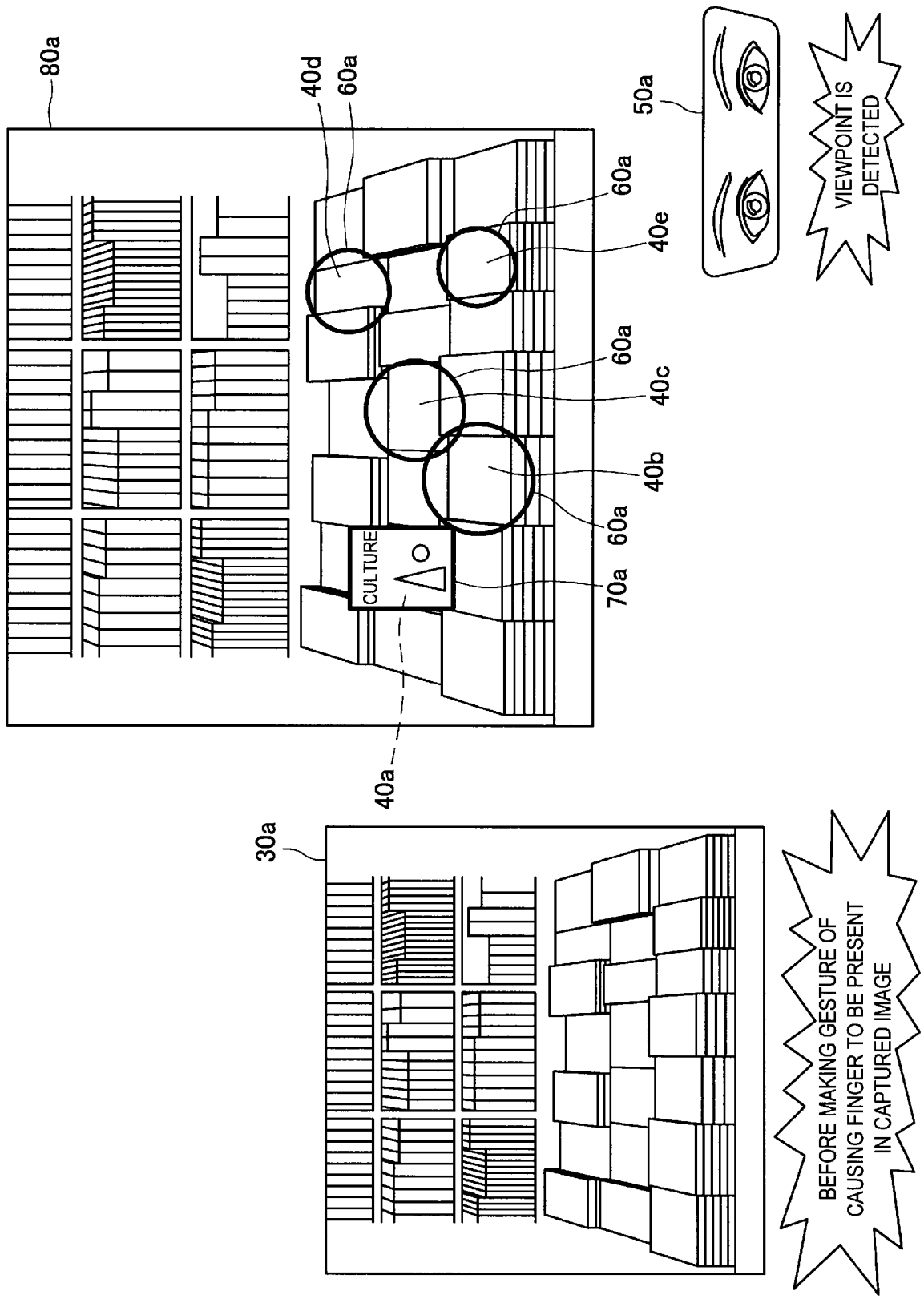

[Fig. 5]
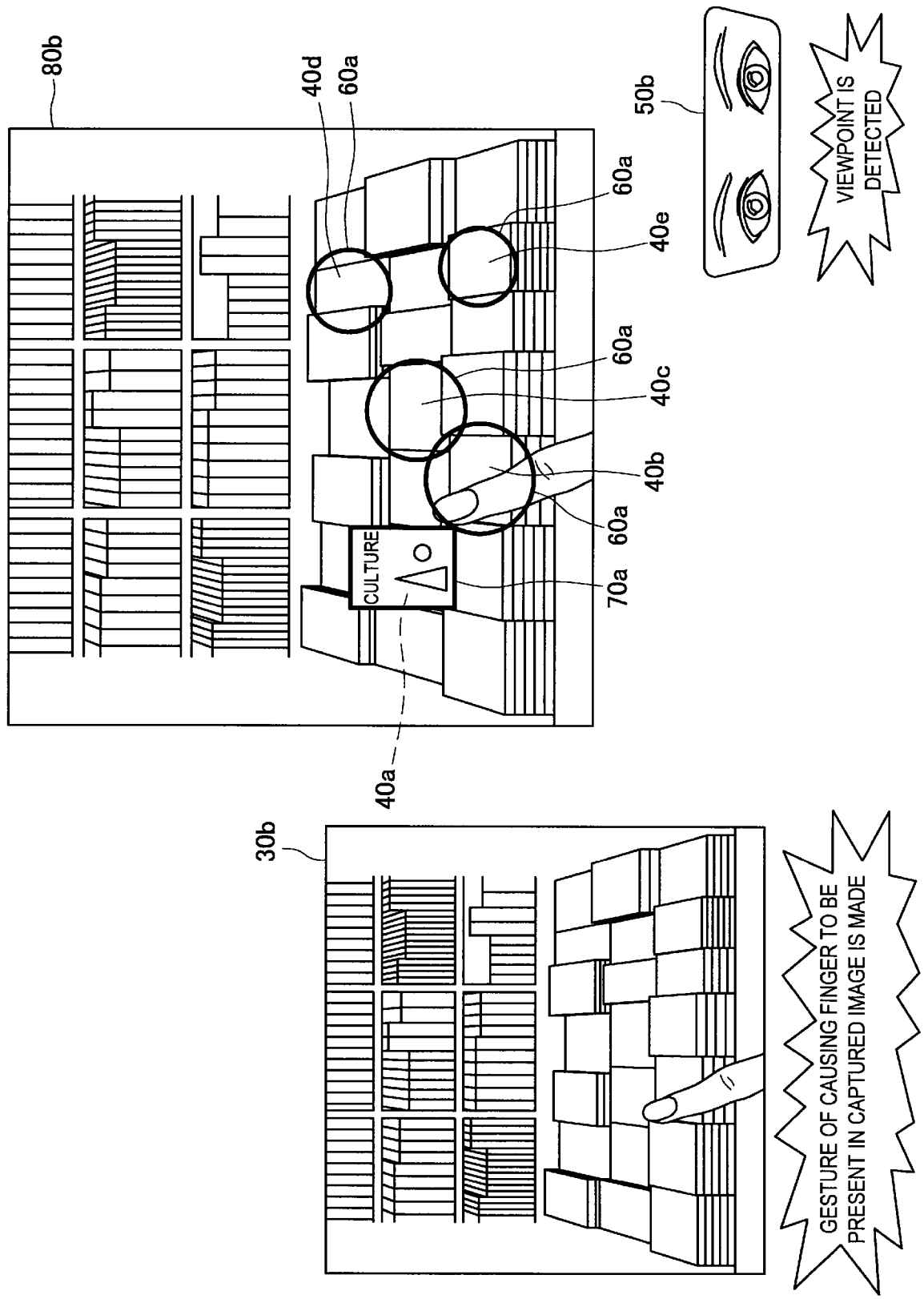

[Fig. 6]
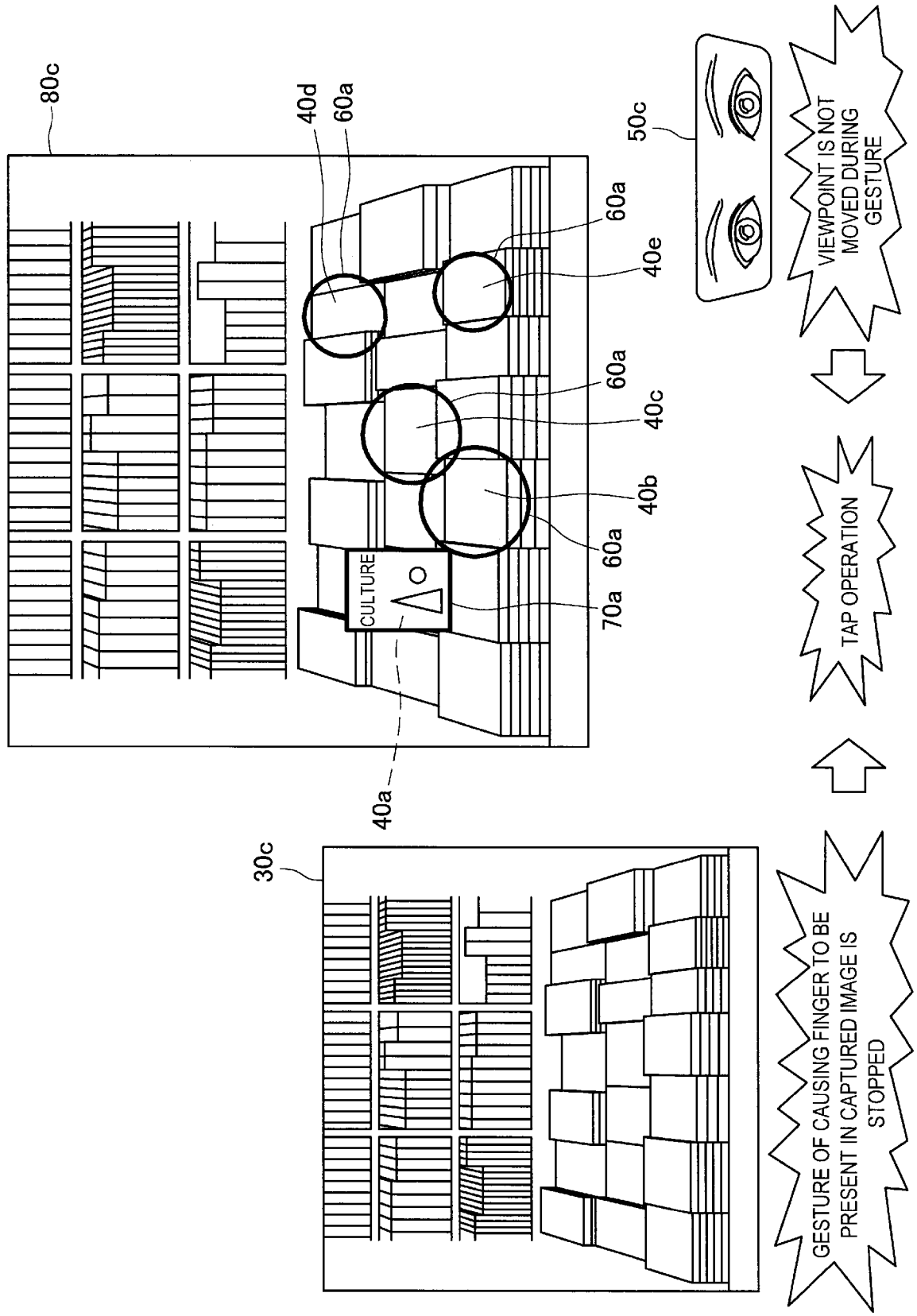

[Fig. 7]
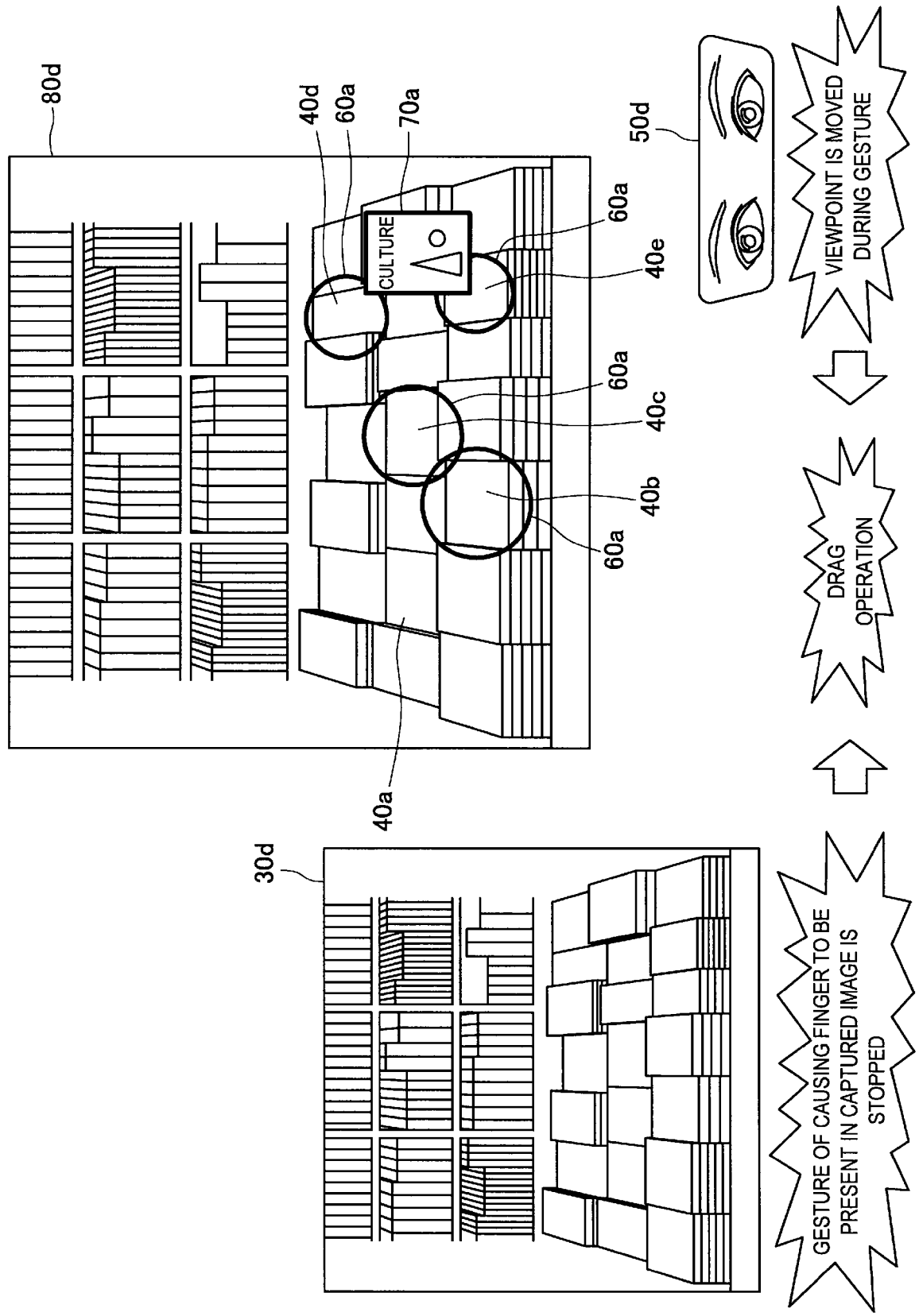

[Fig. 8]
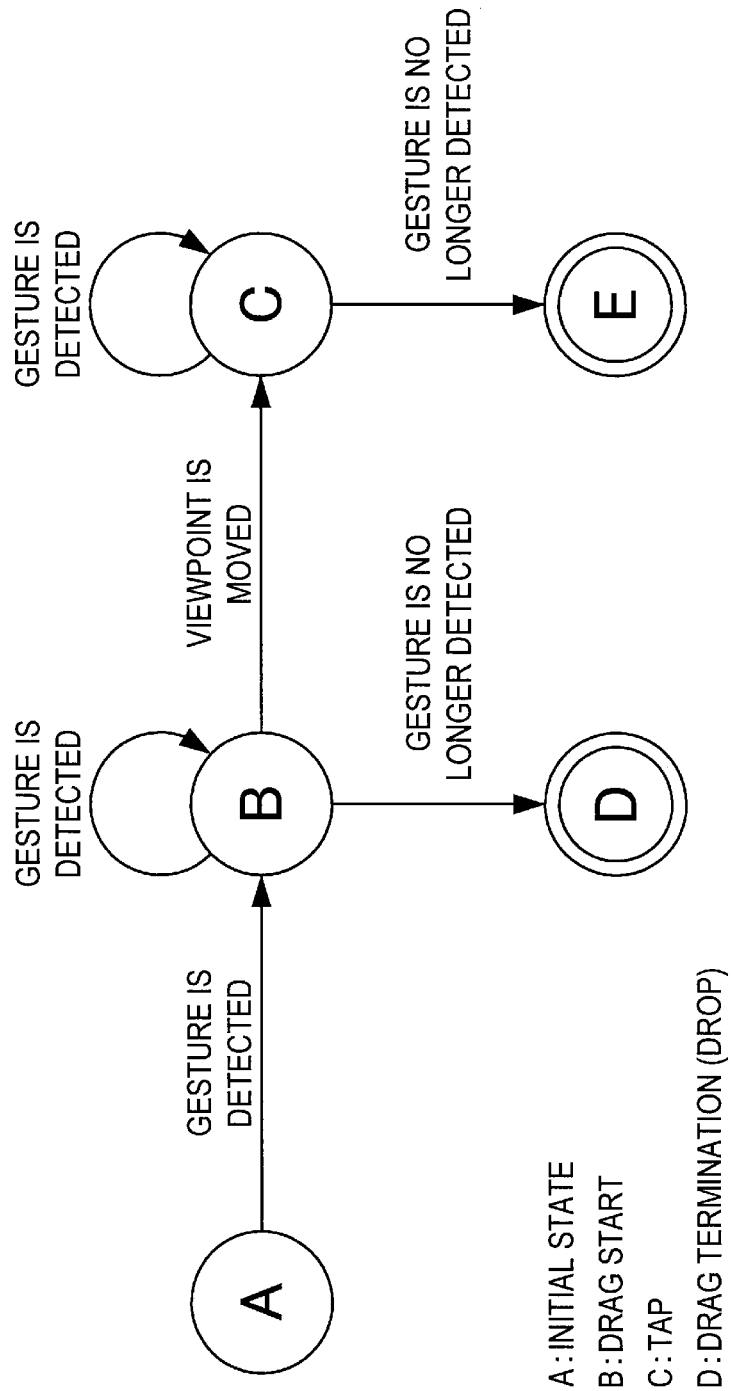

[Fig. 9]
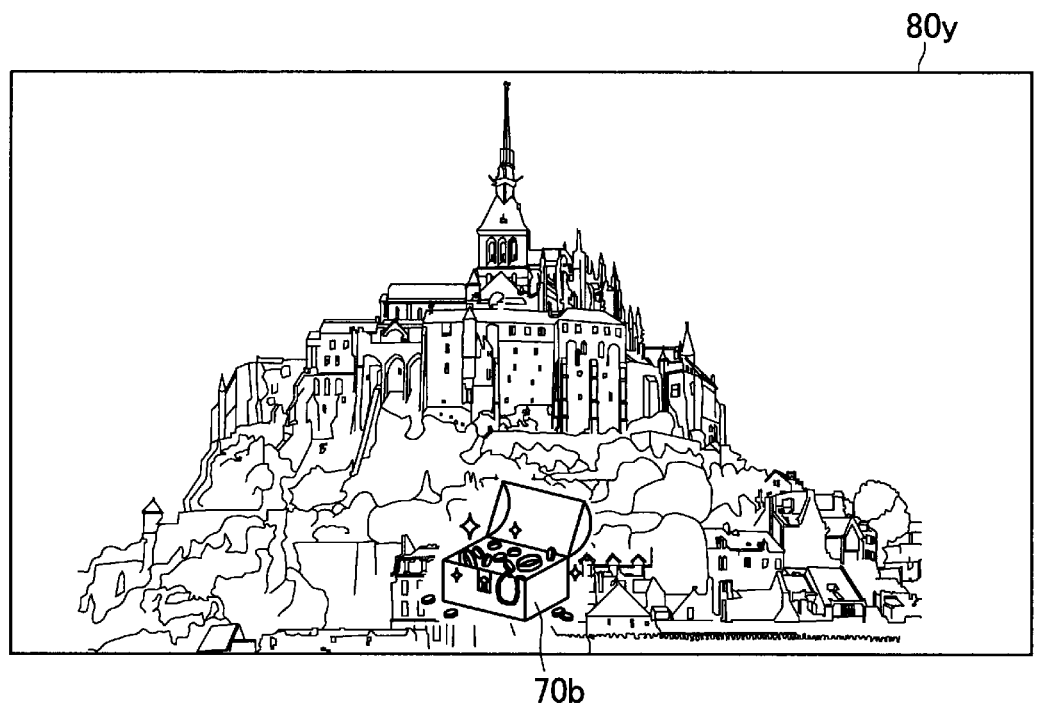
70b
[Fig. 10]
PERFORM DRAG FROM UPPER LEFT CORNER
OF REGION TO LOWER RIGHT CORNER
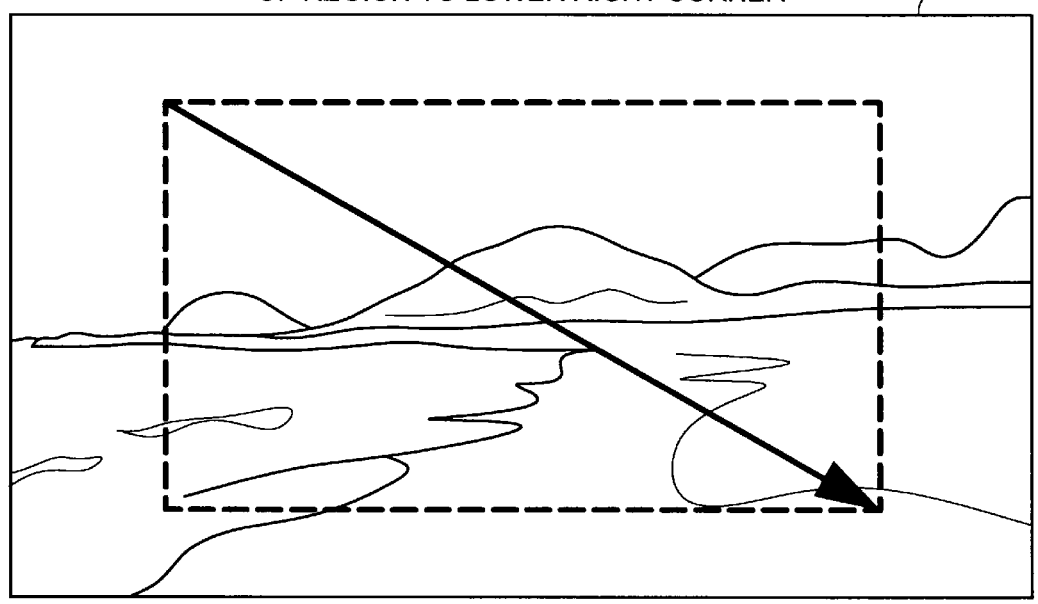

[Fig. 11]
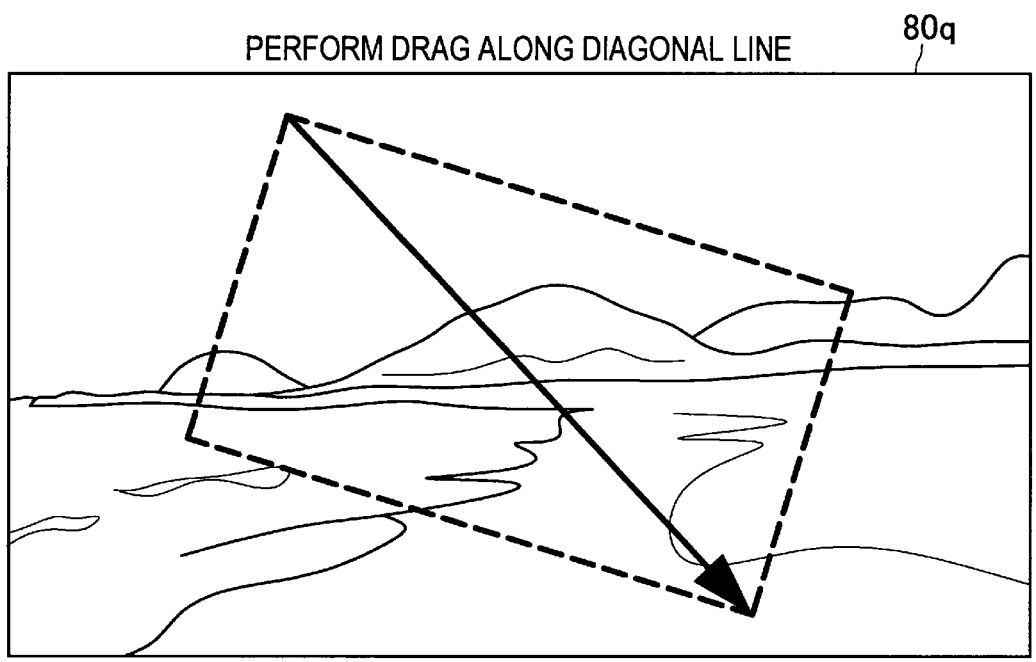
[Fig. 12]
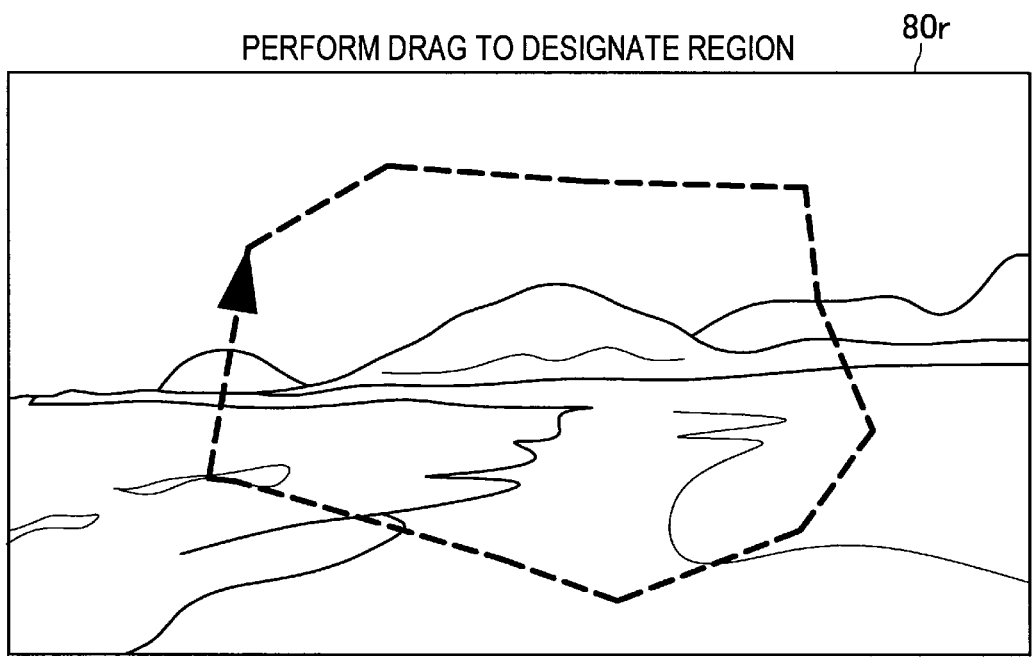

[Fig. 13]
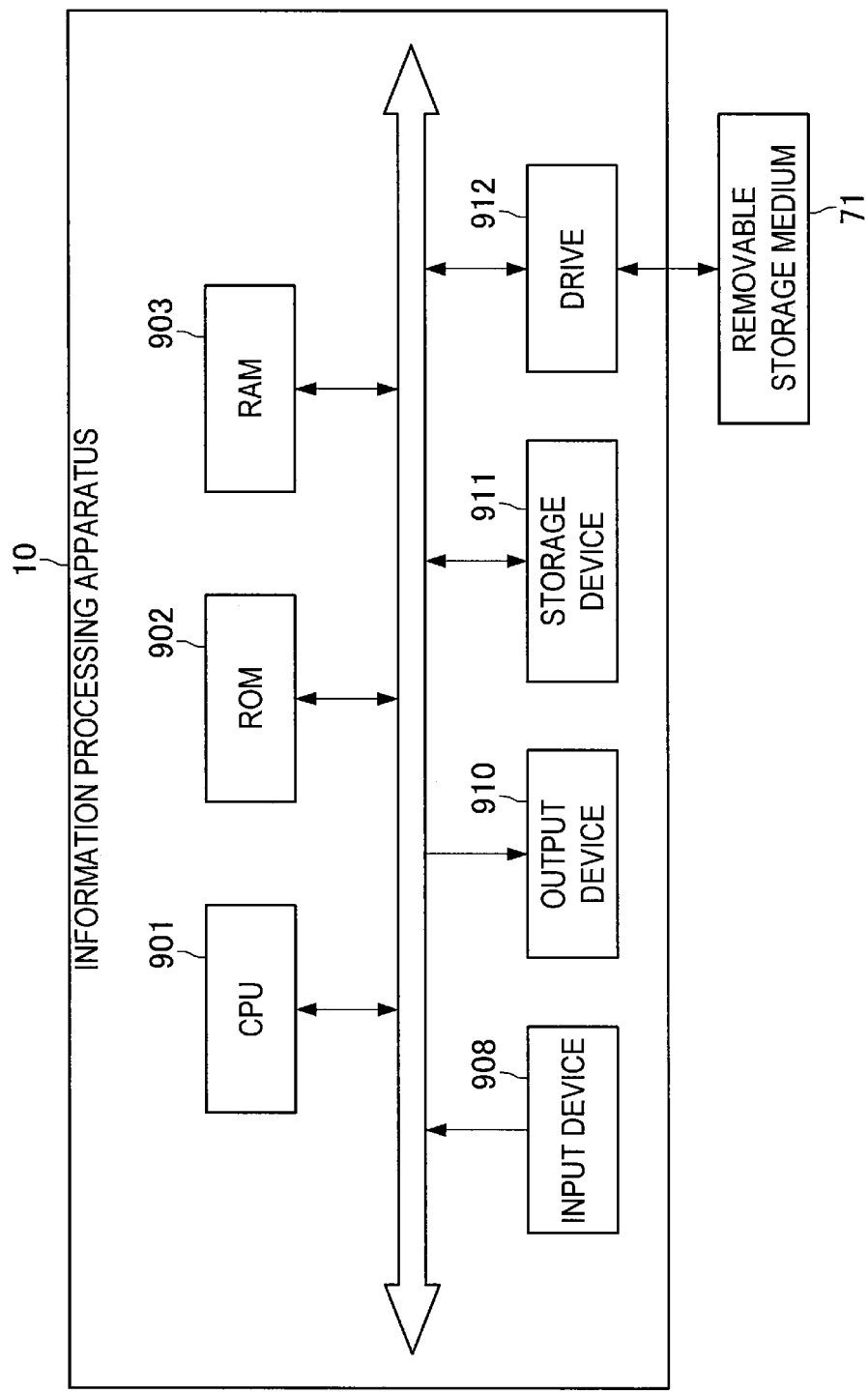

INFORMATION PROCESSING APPARATUS AND INFORMATION PROCESSING METHOD

CROSS REFERENCE TO RELATED APPLICATIONS

This application claims the benefit of Japanese Priority Patent Application JP 2013-046902 filed Mar. 8, 2013, the entire contents of which are incorporated herein by reference.

TECHNICAL FIELD

The present disclosure relates to an information processing apparatus, an information processing method, and a program.

BACKGROUND ART

Apparatuses provided with touch panels such as smartphones have been widely used in recent years. For example, when using an apparatus provided with a touch panel and wishing to designate a position in a captured and displayed image, a user can designate the position by using the touch panel. In addition, for example, when using an apparatus provided with a mouse and wishing to designate a position in a captured and displayed image, a user can designate the position by using the mouse.

Meanwhile, HMDs (Head Mounted Displays) have been increasingly developed as displays each of which is worn on the head of a user. The HMDs sometimes capture an image in a direction of a line of sight of a user, acquire the captured image, and judge, as a position designated by the user in the captured image, a position of an operation body projected in the captured image. However, in such a case, at the stage of projecting the operation body in the captured image, the position of the operation body might be judged as the designated position.

Hence, the following technology is disclosed, for example. A target device is recognized through a captured image, and a switch is superimposed as a graphic image on an object of the captured image (for example, see PTL 1). In such a technology, when the switch is pressed down with a finger of a user, an operation assigned to an object is performed. In other words, when the switch is pressed down with the finger, it is possible to judge that the user designates a position.

In addition, for example, the following technology is disclosed. When a predetermined gesture of the user (for example, a gesture of winking two times successively, or continuing staring for several seconds) is detected, an object located at a viewpoint of a user is selected (for example, see PTL 2). With such a technology, the position of the viewpoint of the user at the time of making a predetermined gesture can be judged as the position designated by the user.

CITATION LIST

Patent Literature

[PTL 1]
JP 2011-209965A
[PTL 2]
JP 2012-8746A

SUMMARY

Technical Problem

However, it is desirable to realize a technology enabling control of an operation based on a captured image while reducing processing load and preventing lowering of user convenience.

Solution to Problem

In a first aspect, an information processing apparatus includes circuitry configured to provide a user interface to a user, determine whether a predetermined object is present in an input recognition area of a sensor, and determine a region of interest within the user interface. The circuitry is further configured to determine, while the predetermined object is determined to be present in the input recognition area, whether the region of interest within the user interface changes. The circuitry is further configured to perform an operation based on whether the region of interest is determined, while the predetermined object is determined to be present in the input recognition area, to change.

In another aspect, an information processing system includes circuitry configured to provide a user interface to a user, determine whether a predetermined object is present in an input recognition area of a sensor, and determine a region of interest within the user interface. The circuitry is further configured to determine, while the predetermined object is determined to be present in the input recognition area, whether the region of interest within the user interface changes. The circuitry is further configured to perform an operation based on whether the region of interest is determined, while the predetermined object is determined to be present in the input recognition area, to change.

In another aspect, a method of an information processing apparatus for performing an operation is provided. The method includes providing, by circuitry of the information processing apparatus, a user interface to a user. A determination is made as to whether a predetermined object is present in an input recognition area of a sensor. A region of interest within the user interface is determined. The method further includes determining, while the predetermined object is determined to be present in the input recognition area, whether the region of interest within the user interface changes. The circuitry of the information processing apparatus performs the operation based on whether the region of interest is determined, while the predetermined object is determined to be present in the input recognition area, to change.

In a further aspect, a non-transitory computer-readable storage medium storing instructions which, when executed by a computer, cause the computer to perform a method of an information processing apparatus for performing an operation is provided. The method includes providing, by the computer, a user interface to a user. A determination is made as to whether a predetermined object is present in an input recognition area of a sensor. A region of interest within the user interface is determined. The method further includes determining, while the predetermined object is determined to be present in the input recognition area, whether the region of interest within the user interface changes. The computer performs the operation based on whether the region of interest is determined, while the predetermined object is determined to be present in the input recognition area, to change.

Advantageous Effects of Invention

As described above according to the embodiments of the present disclosure, there can be provided a technology enabling control of an operation based on a captured image while reducing processing load and preventing lowering of user convenience.

BRIEF DESCRIPTION OF DRAWINGS

FIG. 1 is a diagram illustrating a configuration example of an information processing system according to an embodiment of the present disclosure.

FIG. 2 is a diagram illustrating a functional configuration example of an information processing apparatus according to an embodiment of the present disclosure.

FIG. 3 is a diagram illustrating an example of a result of recognizing objects projected in a captured image.

FIG. 4 is a diagram illustrating a display example of an object before a predetermined gesture is made and an imaging result example.

FIG. 5 is a diagram illustrating a display example of the object at the time when the predetermined gesture is started and an imaging result example.

FIG. 6 is a diagram illustrating a display example of the object and an imaging result example, the display example showing a case where a viewpoint is not moved by the time the predetermined gesture is stopped.

FIG. 7 is a diagram illustrating a display example of the object and an imaging result example, the display example showing a case where the viewpoint is moved by the time the predetermined gesture is stopped.

FIG. 8 is a diagram illustrating an example of an operation of the information processing system according to an embodiment of the present disclosure.

FIG. 9 is a diagram illustrating an execution example of a tap operation performed by an operation execution unit.

FIG. 10 is a diagram illustrating Execution Example 1 of a drag operation performed by the operation execution unit.

FIG. 11 is a diagram illustrating Execution Example 2 of the drag operation performed by the operation execution unit.

FIG. 12 is a diagram illustrating Execution Example 3 of the drag operation performed by the operation execution unit.

FIG. 13 is a diagram illustrating a hardware configuration example of the information processing apparatus according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in this specification and the appended drawings, a plurality of structural elements that have substantially the same function and structure might be denoted with the same reference numerals suffixed with different letters or numbers to be discriminated from each other. However, when not having to be particularly discriminated from each other, the plurality of structural elements that have substantially the same function and structure are denoted with the same reference numerals only.

Headings in the following order are used for "Description of Embodiments".
1. Embodiments
1-1. Configuration Example of Information Processing System
1-2. Functional Configuration Example of Information Processing System
1-3. Details of Information Processing System Functions
1-4. Operation of Information Processing System
1-5. Tapping Operation Example
1-6. Drag Operation Examples
1-7. Hardware Configuration Example
2. Summarization 1. Embodiments Firstly, embodiments of the present disclosure will be described.

(1-1. Configuration Example of Information Processing System)

A description is firstly given of a configuration example of an information processing system 1 according to an embodiment of the present disclosure. FIG. 1 is a diagram illustrating the configuration example of the information processing system 1 according to the embodiment of the present disclosure. As illustrated in FIG. 1, the information processing system 1 includes an information processing apparatus 10, an imaging unit 130, a sensor unit 140, and an output unit 150.

The imaging unit 130 has a function of capturing an image in an imaging range. For example, the imaging unit 130 is worn on the head of a user so that an image can be captured in a direction of a line of sight of the user. A captured image 30 acquired by being captured by the imaging unit 130 is provided to the information processing apparatus 10 by using, for example, wireless or wired signals. Note that the imaging unit 130 is configured separately from the information processing apparatus 10 in an example illustrated in FIG. 1, but may be incorporated into the information processing apparatus 10.

In the example illustrated in FIG. 1, objects 40*a*, 40*b*, 40*c*, 40*d*, and 40*e* are present in the imaging range, and thus are projected in the captured image 30. Note that the case where the objects 40*a* to 40*e* are books is taken as an example in the following description, but the objects 40*a* to 40*e* may be materials other than books, such as music or movies. In addition, the number of the objects 40 which are present in the imaging range is not particularly limited.

The sensor unit 140 has a function of capturing an image from a predetermined part of the body of the user. For example, the sensor unit 140 captures an image of a region of eyes of the user to acquire an imaging result. Although the following description mainly assumes the case where the sensor unit 140 captures an image of the region of the user' eyes, the sensor unit 140 may capture an image of a region of one of the user's eyes. The predetermined part of which the sensor unit 140 captures an image is not limited to the region of the eye or eyes of the user. For example, the predetermined part of which the sensor unit 140 captures an image may be another part of the user's body (such as legs, the nose, or the mouse of the user).

An imaging result 50 acquired by capturing an image by the sensor unit 140 is provided to the information processing apparatus 10 by using, for example, wireless or wired signals. Note that the sensor unit 140 is configured separately from the information processing apparatus 10 in the example illustrated in FIG. 1, but may be incorporated into the information processing apparatus 10. In addition, the information processing system 1 may include a sensor in addition to the sensor unit 140.

The output unit 150 has a function of outputting a variety of information in accordance with control signals provided as wireless or wired signals by the information processing apparatus 10. The type of the information outputted by the output unit 150 is not particularly limited. Thus, the information outputted by the output unit 150 may be an image (such as a still image or a moving image) or audio. Although the following description mainly assumes a case where the output unit 150 is a see-through HMD, the output unit 150 may be a non-see-through HMD and may be another output device (for example, an audio output device). Note that the output unit 150 is configured separately from the information processing apparatus 10 in the example illustrated in FIG. 1, but may be integrated into the information processing apparatus 10.

The configuration example of the information processing system 1 according to the embodiment of the present disclosure has heretofore been described.

(1-2. Functional Configuration Example of Information Processing System)

Subsequently, a description is given of a functional configuration example of the information processing system 1 according to an embodiment of the present disclosure. FIG. 2 is a diagram illustrating the functional configuration example of the information processing system 1 according to the embodiment of the present disclosure. As illustrated in FIG. 2, the information processing apparatus 10 according to the embodiment of the present disclosure includes a control unit 110 and a storage unit 120. As described above, each of the imaging unit 130, the sensor unit 140, and the output unit 150 is connected to the information processing apparatus 10 in a wireless or wired manner.

The control unit 110 corresponds to a processor such as a CPU (Central Processing Unit). The control unit 110 exerts various functions of the control unit 110 by executing programs stored in the storage unit 120 or another storage medium. The control unit 110 includes an image acquisition unit 111, a recognition unit 112, an output control unit 113, a gesture detection unit 114, a viewpoint detection unit 115, an operation control unit 116, and an operation execution unit 117. Functions of the functional blocks will be described later.

The storage unit 120 stores a program for operating the control unit 110 by using a storage medium such as a semiconductor memory or a hard disk. The storage unit 120 can store, for example, a variety of data (such as objects to be displayed) used by the program. Note that the storage unit 120 is incorporated into the information processing apparatus 10 in an example illustrated in FIG. 2, but may be configured separately from the information processing apparatus 10.

The functional configuration example of the information processing system 1 according to the embodiment of the present disclosure has heretofore been described.

(1-3. Details of Information Processing System Functions)

Subsequently, a description is given of the details of the functions of the information processing system 1 according to the embodiment of the present disclosure. FIG. 3 is a diagram illustrating an example of a result of recognizing objects projected in a captured image. For example, when the user visits a bookstore and gives a look at books arranged in the bookstore as illustrated in FIG. 1, the imaging unit 130 captures an image in an imaging range. The image acquisition unit 111 acquires the captured image 30 captured by the imaging unit 130.

When the image acquisition unit 111 acquires the captured image 30, the recognition unit 112 recognizes the objects 40a to 40e from the captured image 30. For example, the recognition unit 112 recognizes, from the captured image 30, the objects 40a to 40e and locations and postures of the respective objects 40a to 40e in real space. For example, the recognition unit 112 can recognize the objects 40a to 40e by collating feature amounts determined from the captured image 30 with feature amounts of objects registered in advance.

More specifically, the recognition unit 112 determines feature amounts of the objects 40a to 40e projected in the captured image 30, in accordance with a feature amount determination method such as the SIFT (Scale-Invariant Feature Transform) method or the Random Ferns method, and collates the determined feature amounts with feature amounts of objects registered in advance. Then, the recognition unit 112 recognizes: object identification information associated with feature amounts which best match the feature amounts of the objects 40a to 40e projected in the captured image 30; and the locations and postures of the objects 40a to 40e in the real space.

Here, the recognition unit 112 uses a feature amount dictionary in which a feature amount of each object is associated with object identification information. The feature amount dictionary may be stored in the storage unit 120 or received from a server. The feature amount of the object may be, for example, a set of feature amounts determined from a learning image of the object in accordance with the SIFT method or the Random Ferns method.

Note that the method for recognizing the objects 40a to 40e is not limited to the example. For example, the recognition unit 112 may indirectly recognize the objects 40a to 40e by recognizing a known figure, symbol, or marker (such as an artificial marker or a natural marker) associated with each of the objects 40a to 40e. The recognition unit 112 may also recognize the objects 40a to 40e and the locations and postures of the objects 40a to 40e based on the sizes and shapes of the objects 40a to 40e in the captured image 30.

Although the description has been given of the example in which the recognition unit 112 uses image processing to recognize the locations and postures of the objects 40a to 40e included in the captured image 30, the method for recognizing the locations and postures of the objects 40a to 40e is not limited to the recognition method using image processing. For example, the recognition unit 112 can also detect orientations and current positions of the respective objects 40a to 40e to estimate the locations and postures of the objects 40a to 40e in the captured image 30 based on the detection results.

Note that the recognition unit 112 is included in the information processing apparatus 10 in the example illustrated in FIG. 2, but may be included in a server capable of communicating with the information processing apparatus 10. In such a case, the server is provided with the captured image 30 acquired by the image acquisition unit 111. When recognizing objects based on the captured image 30, the server provides the information processing apparatus 10 with a recognition result.

The output control unit 113 may display objects 60a at positions corresponding to the positions of the objects 40a to 40e in the captured image 30 which are recognized by the recognition unit 112. FIG. 3 illustrates an example of a view 80x of the user in the case where the output control unit 113 displays predetermined figures (for example, circles) exemplifying the objects 60a at positions corresponding to the positions of the objects 40a to 40e in the captured image 30.

Note that the shape of each object 60a is not particularly limited. The display position of the object 60a is not particularly limited, either. The output control unit 113 may display the objects 60a whose postures are changed according to the postures of the respective objects 40a to 40e recognized by the recognition unit 112. The objects 60a may be registered in advance in the storage unit 120. In addition, the objects 60a do not have to be displayed.

The gesture detection unit 114 detects a predetermined gesture of the user. For example, the predetermined gesture may be a gesture of causing a predetermined operation body (such as a finger of the user, a palm of the user, or a pen) to be present in the captured image 30. The gesture detection unit 114 may detect a gesture of causing the predetermined operation body to be present in the captured image 30, for example, by recognizing the predetermined operation body from the captured image 30.

In this case, it is only necessary to know whether or not the predetermined operation body is present in the captured image 30, and it is not necessary to identify the direction, the position, or the like of the predetermined operation body. Thus, reduction of processing load is expected. Alternatively, the predetermined gesture may be a gesture of moving a predetermined part of the user's body (for example, a gesture of closing an eye). For example, the gesture detection unit 114 can detect the gesture of moving the predetermined part of the user's body by analyzing the imaging result 50.

The viewpoint detection unit 115 detects a viewpoint of the user. For example, the viewpoint detection unit 115 detects the user's viewpoint based on the imaging result 50 captured by the sensor unit 140. The technology disclosed in JP 2012-8746A, for example, can be used as the method for detecting the viewpoint by the viewpoint detection unit 115, but the method for detecting the viewpoint by the viewpoint detection unit 115 is not particularly limited. For example, suppose a case where the user gives a look at the object 40a present in the view 80x while referring to the displayed objects 60a. In such a case, the viewpoint detection unit 115 detects the presence of the user's viewpoint at the object 40a present in the view 80x.

Note that the viewpoint detection unit 115 can detect the presence of the user's viewpoint at a plurality of objects 40. For example, when detecting the user's viewpoint moving in such a manner as to surround the plurality of objects 40 (for example, the objects 40a and 40b), the viewpoint detection unit 115 may detect the presence of the user's viewpoint at the plurality of objects 40.

Based on the user's viewpoint detected by the viewpoint detection unit 115 and the predetermined gesture of the user detected by the gesture detection unit 114, the operation control unit 116 controls an operation to be executed by the operation execution unit 117. The operation execution unit 117 executes the operation under the control of the operation control unit 116. Hereinafter, a description is given of an example of how the operation control unit 116 controls an operation.

FIG. 4 is a diagram illustrating a display example of an object 70a before the predetermined gesture is made and an imaging result example. As illustrated in FIG. 4, before the user makes the predetermined gesture, the viewpoint detection unit 115 analyzes an imaging result 50a captured by the sensor unit 140 and detects placement of the viewpoint at the object 40a present in the view 80x.

In such a case, the output control unit 113 can display the object 70a corresponding to the object 40a, at a position corresponding to the position of the object 40a. As the result of the displaying of the object 70a, the user sees a view 80a. However, the object 70a does not have to be displayed. The object 70a corresponding to the object 40a may be registered in advance in the storage unit 120, for example, or may be acquired from the server.

FIG. 5 is a diagram illustrating a display example of the object 70a at the time when the predetermined gesture is started and an imaging result example. When the user makes the predetermined gesture, the gesture detection unit 114 detects the predetermined gesture. In an example illustrated in FIG. 5, the gesture detection unit 114 detects as the predetermined gesture a gesture of causing a finger of the user to be present in the captured image 30, and thus the user sees a view 80b. The viewpoint detection unit 115 at this time analyzes an imaging result 50b captured by the sensor unit 140 and detects placement of the viewpoint at the object 70a present in the view 80b.

FIG. 6 is a diagram illustrating a display example of the object and an imaging result example, the display example showing a case where the viewpoint is not moved by the time the predetermined gesture is stopped. FIG. 7 is a diagram illustrating a display example of the object and an imaging result example, the display example showing a case where the viewpoint is moved by the time the predetermined gesture is stopped. When the user stops the predetermined gesture, the gesture detection unit 114 detects the stopping of the predetermined gesture. In examples illustrated in FIGS. 6 and 7, the gesture detection unit 114 detects the stopping of the gesture of causing the finger of the user in the captured image 30.

Here, the operation control unit 116 controls an operation based on the captured image 30 depending on whether or not the user moves the viewpoint during the predetermined gesture. Such a configuration enables objects located beyond the reach of the finger of the user to operate, thus enhancing the user convenience. In addition, it is not necessary to perform such image processing that hides part of a switch, and thus is possible to reduce the processing load. Further, it is not necessary to detect a finger press-down operation, and thus is not necessary to capture an image at high speed and to have a high image processing performance. Moreover, it is also possible to execute an operation other than an operation of selecting an object, and thus the user convenience is enhanced.

Whether or not the user moves the viewpoint may be judged by using any method. For example, in a case where the sensor unit 140 repeats capturing an image and acquiring the imaging result 50, whether or not the viewpoint is moved may be judged based on change of the location of the user's viewpoint detected every predetermined frames by the viewpoint detection unit 115. For example, the operation control unit 116 may judge that the viewpoint is moved when the location of the user's viewpoint is changed.

Alternatively, in a case where a sensor is worn on the head of the user, whether or not the viewpoint is moved may be judged based on a result of detection by the sensor. For example, in a case where an acceleration sensor is worn on the head of the user, the operation control unit 116 may judge that the viewpoint is moved, when a value of acceleration detected by the acceleration sensor exceeds a predetermined value. In addition, for example, in a case where a gyro sensor is worn on the head of the user, the operation control unit 116 may judge that the viewpoint is moved, when a value of angular velocity detected by the gyro sensor exceeds a predetermined value.

Firstly, a case where the user does not move the viewpoint during the predetermined gesture will be described with reference to FIG. 6. In other words, the viewpoint detection unit 115 analyzes an imaging result 50c of an image captured after the end of the predetermined gesture and detects the placement of the viewpoint at the object 70a present in a view 80c. In such a case, the operation control unit 116 controls a tap operation so that the tap operation is executed in the captured image 30. For example, when the user does not move the viewpoint during the predetermined gesture, the operation control unit 116 may control the tap operation so that the tap operation is executed at the position of the viewpoint.

The tap operation at the position of the viewpoint is not particularly limited. For example, when the user does not move the viewpoint during the predetermined gesture, the operation control unit 116 may control an operation of selecting the object 70a which is present at the position of the viewpoint so that the operation is executed. In an example illustrated in FIG. 6, the user does not move the viewpoint during the predetermined gesture, and thus the operation execution unit 117 executes the operation of selecting the object 70a which is present at the position of the viewpoint.

Note that the object 70a illustrated in FIG. 6 is an object virtually displayed by the output unit 150. However, an object selected by the operation execution unit 117 does not have to be a virtually displayed object. In other words, the object selected by the operation execution unit 117 may be a real object (such as any of the objects 40a to 40e) present in the view 80x.

Specific processing to be executed as a result of the operation of selecting the object 70a is not particularly limited. For example, the operation execution unit 117 may display information on the object 70a as a result of the operation of selecting the object 70a. Since the object 70a is a book in the example illustrated in FIG. 6, the operation execution unit 117 may display information on a book as a result of the operation of selecting the object 70a (information on the title of the book, an author of the book, a story of the book, or contents of the book, and an advertisement image of the book by using a still image or a moving image).

Next, a case where the user moves the viewpoint during the predetermined gesture will be described with reference to FIG. 7. The viewpoint detection unit 115 analyzes an imaging result 50d captured during the predetermined gesture and detects movement of the viewpoint. In such a case, the operation control unit 116 controls a drag operation so that the drag operation is executed in the captured image 30. For example, when the user moves the viewpoint during the predetermined gesture, the operation control unit 116 may control the drag operation so that the drag operation is executed in accordance with the movement of the viewpoint based on a position of the viewpoint at the start of the movement of the viewpoint.

The drag operation according to an amount of the movement of the viewpoint based on the position of the viewpoint at the start of the movement of the viewpoint is not particularly limited. For example, when the user moves the viewpoint during the predetermined gesture, the operation control unit 116 may control movement of the object 70a so that the movement is executed in accordance with the movement of the viewpoint based on the position of the viewpoint at the start of the movement of the viewpoint. In an example in FIG. 7, the user moves the viewpoint during the predetermined gesture, and thus the operation execution unit 117 executes the operation of moving the object 70a in a moving direction by an amount of movement of the viewpoint based on the position of the viewpoint at the start of the movement of the viewpoint. As the result, the user sees a view 80d.

Note that the object 70a illustrated in FIG. 7 is an object virtually displayed by the output unit 150. However, an object dragged by the operation execution unit 117 does not have to be a virtually displayed object. In other words, the object dragged by the operation execution unit 117 may be a real object (such as any of the objects 40a to 40e) present in the view 80x.

The details of the functions of the information processing system 1 according to the embodiment of the present disclosure have heretofore been described.

(1-4. Operation of Information Processing System)

Subsequently, a description is given of an example of an operation of the information processing system 1 according to an embodiment of the present disclosure. FIG. 8 is a diagram illustrating the example of the operation of the information processing system 1 according to the embodiment of the present disclosure. As illustrated in FIG. 8, the user makes the predetermined gesture in an initial state (a state A). When the gesture detection unit 114 detects the predetermined gesture, the state transitions to a state B.

Here, as long as the predetermined gesture is detected, the state B continues. However, when the viewpoint detection unit 115 no longer detects the predetermined gesture before detecting movement of the user's viewpoint, the operation control unit 116 performs control so that the operation execution unit 117 executes a tap operation (a state D). In contrast, when movement of the viewpoint is detected while the predetermined gesture is detected, the state transitions to a state C. In the state C, a drag operation is started.

Here, as long as the predetermined gesture is detected, the state C continues. However, when the predetermined gesture is no longer detected, the operation control unit 116 controls the drag operation by the operation execution unit 117 so that the drag operation is terminated (a state E).

The example of the operation of the information processing system 1 according to the embodiment of the present disclosure has heretofore been described.

(1-5. Tapping Operation Example)

Subsequently, a description is given of an execution example of a tap operation executed by the operation execution unit 117. FIG. 9 is a diagram illustrating the execution example of the tap operation performed by the operation execution unit 117. As illustrated in FIG. 9, the output control unit 113 displays an object 70b in a view 80y of the user, based on a recognition result acquired in such a manner that the recognition unit 112 recognizes the captured image. Here, when the tap operation is performed on the object 70b as described above, the operation execution unit 117 may display a moving image in which the object 70b moves (for example, a moving image in which a treasure box is opened as illustrated in FIG. 9, the treasure box being the object 70b).

In addition, the operation execution unit 117 may be configured to be able to acquire a discount coupon from the server when a tap operation is performed on the object 70b as described above. In the example in FIG. 9, the object 70 is a treasure-box-type object, but the type of the object is not particularly limited. For example, the object 70 may be a button. Anyhow, when a tap operation is performed on the object 70b, the operation execution unit 117 only has to execute an operation assigned to the object 70b.

The execution example of the tap operation executed by the operation execution unit 117 has heretofore been described.

1-6. Drag Operation Examples

Subsequently, a description is given of an execution example of a drag operation executed by the operation execution unit 117. FIG. 10 is a diagram illustrating Execution Example 1 of a drag operation performed by the operation execution unit 117. As illustrated in FIG. 10, the image acquisition unit 111 acquires a captured image. Here, when a drag operation is performed in a view 80p of the user as described above, the operation control unit 116 may control region selection so that the region selection is executed in accordance with movement of the viewpoint.

For example, as illustrated in FIG. 10, the operation control unit 116 may perform control so that the operation execution unit 117 executes an operation of selecting a rectangular region in the view 80p of the user. The rectangular region has: a diagonal line extending from a viewpoint at the start of the drag to a viewpoint at the end of the drug; a lateral side extending in a horizontal direction of the view 80p of the user; and a lengthwise side extending in a vertical direction of the view 80p of the user.

Subsequently, a description is given of Execution Example 2 of the drag operation executed by the operation execution unit 117. FIG. 11 is a diagram illustrating Execution Example 2 of the drag operation executed by the operation execution unit 117. For example, as illustrated in FIG. 11, the operation control unit 116 may perform control so that the operation execution unit 117 executes an operation of selecting a rectangular region in a view 80q of the user. The rectangular region has a diagonal line extending from a viewpoint at the start of the drag to a viewpoint at the end of the drug; and a longitudinal side and a short side which extend in accordance with an aspect ratio specified in advance.

Subsequently, a description is given of Execution Example 3 of the drag operation executed by the operation execution unit 117. FIG. 12 is a diagram illustrating Execution Example 3 of the drag operation performed by the operation execution unit 117. For example, as illustrated in FIG. 12, the operation control unit 116 may perform control so that the operation execution unit 117 executes an operation of selecting a closed region formed by connecting viewpoints from the start to the end of the drag in a view 80r of the user.

The execution examples of the drag operation executed by the operation execution unit 117 are not limited to the examples. For example, the operation execution unit 117 designates a plurality of objects present in a view of the user by selecting a region defined in accordance with movement of the viewpoint, and thereby can start a function to be exerted by the combined objects.

For example, the operation execution unit 117 may designate a plurality of cases of music recording media arranged on a wall, by selecting a region, and thereby generate a playlist of the music recording media. For example, the operation execution unit 117 may also select a plurality of books at a bookstore by selecting a region, sort the books in ascending order of evaluation, and thereby display a sorting result. For example, the operation execution unit 117 may also select, from a map (or a transfer guide map), a range in which the user wishes to pass through by selecting a region, and thereby search for a route in the range.

In addition, for example, the operation execution unit 117 can also execute such an operation as a drag-and-drop from an object recognized by the recognition unit 112 to another object recognized by the recognition unit 112.

For example, suppose a case where objects recognized by the recognition unit 112 are a television device and a music-reproducing device and where the user likes music content outputted from the television device and performs a drag-and-drop from the television device to the music-reproducing device.

In such a case, the operation execution unit 117 may instruct the television device to transmit content identification information for identifying the music content to the music-reproducing device. This enables the music-reproducing device receiving the content identification information from the television device to reproduce the music content identified by the content identification information.

In addition, for example, suppose a case where an object recognized by the recognition unit 112 is a television device placed in a living room and where the user likes video content outputted from the television device and wishes to view the rest of the video content in a bed room.

In such a case, the user only has to start a drag operation based on a position of the television device to the bed room and perform a drop operation of another television device in the bed room recognized by the recognition unit 112. In such a case, the operation execution unit 117 may also instruct the television device in the living room to transmit identification information of the video content and a reproduction position of the video content to the other television device. This enables the other television device receiving the identification information and the reproduction position from the television device in the living room to reproduce the rest of the video content identified by the identification information.

For example, the operation execution unit 117 can also execute such an operation as a drag-and-drop from an object recognized by the recognition unit 112 to an object displayed by the output unit 150. In addition, even when there are a plurality of objects displayed by the output unit 150, the user can easily designate a drop target object by using the line of sight.

For example, suppose a case where objects recognized by the recognition unit 112 are items (or barcodes of items) sold in a shopping mall or the like and where the objects displayed by the output unit 150 are "father's cart", "mother's cart", "my cart", and a "wish cart". In addition, a family go to a large shopping mall for shopping, and are free to do as they like.

At this time, the user who is part of the family finds an item the user's mother might like, and performs a drag-and-drop from the item to "mother's cart". In such a case, the operation execution unit 117 may store information on the item (such as an item name) in association with "mother's cart". This enables the item stored in association with "mother's cart" to be checked when an operation of viewing the content of "mother's cart" is performed.

In addition, suppose a case where the user finds an item, hesitates over buying the item, and performs a drags-and-drop from the item to the "wish cart". In such a case, the operation execution unit 117 may store information on the item (such as an item name) in association with the "wish cart". This enables the item stored in association with the "wish cart" to be checked when an operation of viewing the content of the "wish cart" is performed.

In addition, for example, the operation execution unit 117 can also perform such an operation as a drag-and-drop from an object displayed by the output unit 150 to another object displayed by the output unit 150. In addition, even when there are a plurality of objects displayed by the output unit 150, the user can easily designate a drop target object by using the line of sight.

For example, suppose a case where objects displayed by the output unit 150 are information superimposed by using AR (Augmented Reality) technology (hereinafter, also simply referred to as "AR information") and a storage folder of the user. At this time, the user wishes to view later carefully the AR information superimposed on the user's view by using the AR technology, and drags the AR information to the storage folder.

In such a case, the operation execution unit 117 can store the AR information in the storage folder. Even when there are a plurality of pieces of AR information in the user's view, the operation execution unit 117 can store only AR information which the user wishes to store, in the storage folder by using movement of the line of sight of the user.

The execution example of the drag operation executed by the operation execution unit 117 has heretofore been described.

(1-7. Hardware Configuration Example)

Subsequently, a description is given of a hardware configuration example of the information processing apparatus 10 according to an embodiment of the present disclosure. FIG. 13 is a diagram illustrating the hardware configuration example of the information processing apparatus 10 according to the embodiment of the present disclosure. However, the hardware configuration example illustrated in FIG. 13 merely provides an example of the hardware configuration of the information processing apparatus 10. Accordingly, the hardware configuration of the information processing apparatus 10 is not limited to the example illustrated in FIG. 13.

As illustrated in FIG. 13, the information processing apparatus 10 includes a CPU (Central Processing Unit) 901, a ROM (Read Only Memory) 902, a RAM (Random Access Memory) 903, an input device 908, an output device 910, a storage device 911, and a drive 912.

The CPU 901 functions as an arithmetic processing unit and a controller device, and controls overall operation of the information processing apparatus 10 according to a variety of programs. The CPU 901 may also be a microprocessor. The ROM 902 stores therein programs, operational parameters, and the like which are used by the CPU 901. The RAM 903 temporarily stores therein the programs used and executed by the CPU 901, parameters appropriately varying in executing the programs, and the like. These are connected to each other by a host bus configured by a CPU bus or the like.

The input device 908 receives a result of an image captured by the sensor unit 140 and input of an image captured by the imaging unit 130. Sensor data and the captured image of which input is received by the input device 908 are outputted to the CPU 901. The input device 908 may output a result of detection by another sensor to the CPU 901.

The output device 910 provides the output unit 150 with output data. When the output unit 150 is formed by a display device as described above, the output device 910 provides the output unit 150 with data to be displayed under the control of the CPU 901. When the output unit 150 is an audio output device, the output device 910 provides the output unit 150 with audio data under the control of the CPU 901.

The storage device 911 is a device for storing data, exemplifying the storage unit 120 of the information processing apparatus 10. The storage device 911 may include a storage medium, a storage device configured to store data in a storage medium, a reader configured to read data from a storage medium, a deletion device configured to delete stored data, and the like. The storage device 911 stores programs to be executed by the CPU 901 and a variety of data.

The drive 912 is a reader/writer for a storage medium and is built in the information processing apparatus 10 or is provided externally. The drive 912 information recorded in a magnetic disk, an optical disk, a magneto-optical disk, or a removable storage medium 71 such as a semiconductor memory each of which is loaded in the drive 912, and outputs the information to the RAM 903. The drive 912 can write information to the removable storage medium 71.

The hardware configuration example of the information processing apparatus 10 according to the embodiment of the present disclosure has heretofore been described.

2. Summarization

As described above according to the embodiments of the present disclosure, there is provided the information processing apparatus 10 including the image acquisition unit 111 configured to acquire a captured image and the operation control unit 116 configured to control an operation based on the captured image depending on whether or not the user moves the viewpoint during the predetermined gesture.

Such a configuration enables objects located beyond the reach of the finger of the user to operate, thus enhancing the user convenience. In addition, it is not necessary to perform such image processing that hides part of a switch, and thus is possible to reduce the processing load. Further, it is not necessary to detect a finger press-down operation, and thus is not necessary to capture an image at high speed and to have a high image processing performance. Moreover, it is also possible to execute an operation other than an operation of selecting an object, and thus the user convenience is enhanced.

In addition, it is only necessary to detect the predetermined gesture and detect whether or not the viewpoint is moved, and thus the user does not have to touch the apparatus for operation. Thus, it is possible to reduce not only blurring of an image captured by the imaging unit 130 but also flickering of an image outputted by the output unit 150.

Meanwhile, when a user uses a see-through HMD, a person near the user might not know what is happening on the user, what the user is seeing, what the user is operating, and the like. In particular, when only the line of sight of the user is used for judgment as in the technology disclosed in JP 2012-8746A, a person near the user might not know what the user is seeing. Including an index finger or the like in the gesture helps the person near the user easily know what the user is doing.

It should be understood by those skilled in the art that various modifications, combinations, sub-combinations and alterations may occur depending on design requirements and other factors insofar as they are within the scope of the appended claims or the equivalents thereof.

It is also possible to generate a program for causing the hardware such as the CPU, the ROM, and the RAM which are built in a computer to exert functions equivalent to those in the configuration of the information processing apparatus 10 described above. There is also provided a computer-readable storage medium in which the program is recorded.

Additionally, the present technology may also be configured as below.

(1) An information processing apparatus, comprising: circuitry configured to provide a user interface to a user, determine whether a predetermined object is present in an input recognition area of a sensor, determine a region of interest within the user interface, determine, while the predetermined object is determined to be present in the input recognition area, whether the region of interest within the user interface changes, and perform an operation based on whether the region of interest is determined, while the predetermined object is determined to be present in the input recognition area, to change.

(2) The information processing apparatus of (1), wherein the circuitry is further configured to perform the operation when the predetermined object is determined to no longer be present in the input recognition area.

(3) The information processing apparatus of (1) or (2), wherein the circuitry is further configured to determine the region of interest within the user interface based on another sensor that is configured to generate data representative of a viewing direction of the user.

(4) The information processing apparatus of (3), wherein the another sensor is one of a camera, an acceleration sensor, and a gyro sensor.

(5) The information processing apparatus of any of (1) to (4), wherein the operation is a tap, click, or select operation on an object corresponding to the determined region of interest when the region of interest within the user interface does not change while the predetermined object is determined to be present in the input recognition area.

(6) The information processing apparatus of any of (1) to (5), wherein the operation is a drag operation on an object corresponding to the determined region of interest when the region of interest within the user interface changes while the predetermined object is determined to be present in the input recognition area.

(7) The information processing apparatus of any of (1) to (6), wherein the operation is an instruction to a first device to transmit predetermined information to a second device.

(8) The information processing apparatus of (7), wherein the first device is a television.

(9) The information processing apparatus of any of (1) to (8), wherein the operation is transmission of a request to another device for sending predetermined data to the information processing apparatus.

(10) The information processing apparatus of (9), wherein the circuitry is further configured to receive data from the another device in response to the request.

(11) The information processing apparatus of (9), wherein the circuitry is further configured to receive a discount coupon from the another device in response to the request.

(12) The information processing apparatus of any of (1) to (11), wherein the operation is a drag operation on an object corresponding to the determined region of interest that is based on an amount of change of the region of interest.

(13) The information processing apparatus of any of (1) to (12), wherein the sensor is a camera configured to capture an image of the predetermined object.

(14) The information processing apparatus of any of (1) to (13), further comprising: a display implemented in a head-mounted display unit and configured to present the user interface to the user.

(15) The information processing apparatus of any of (1) to (14), wherein the circuitry is further configured to determine the region of interest within the user interface when the predetermined object is determined to be present in the input recognition area.

(16) The information processing apparatus of any of (1) to (15), wherein the circuitry is further configured to determine whether a predetermined operation body, which corresponds to the predetermined object, is present in the input recognition area or whether a gesture of moving a predetermined part of the predetermined operation body is detected.

(17) An information processing system, comprising: circuitry configured to provide a user interface to a user, determine whether a predetermined object is present in an input recognition area of a sensor, determine a region of interest within the user interface, determine, while the predetermined object is determined to be present in the input recognition area, whether the region of interest within the user interface changes, and perform an operation based on whether the region of interest is determined, while the predetermined object is determined to be present in the input recognition area, to change.

(18) A method of an information processing apparatus for performing an operation, the method comprising: providing, by circuitry of the information processing apparatus, a user interface to a user; determining whether a predetermined object is present in an input recognition area of a sensor; determining a region of interest within the user interface; determining, while the predetermined object is determined to be present in the input recognition area, whether the region of interest within the user interface changes; and performing, by the circuitry of the information processing apparatus, the operation based on whether the region of interest is determined, while the predetermined object is determined to be present in the input recognition area, to change.

(19) A non-transitory computer-readable storage medium storing instructions which, when executed by a computer, cause the computer to perform a method of an information processing apparatus for performing an operation, the method comprising: providing, by the computer, a user interface to a user; determining whether a predetermined object is present in an input recognition area of a sensor; determining a region of interest within the user interface; determining, while the predetermined object is determined to be present in the input recognition area, whether the region of interest within the user interface changes; and performing, by the computer, the operation based on whether the region of interest is determined, while the predetermined object is determined to be present in the input recognition area, to change.

(20) An information processing apparatus including: an image acquisition unit configured to acquire a captured image; and an operation control unit configured to control an operation based on the captured image depending on whether or not a user moves a viewpoint during a predetermined gesture.

(21) The information processing apparatus of (20), wherein when the user does not move the viewpoint during the predetermined gesture, the operation control unit performs control in a manner that a tap operation is executed in the captured image.

(22) The information processing apparatus of (20) or (21), wherein when the user does not move the viewpoint during the predetermined gesture, the operation control unit performs control in a manner that the tap operation is executed at a position where the viewpoint is placed.

(23) The information processing apparatus of any one of (20) to (22), wherein when the user does not move the viewpoint during the predetermined gesture, the operation control unit performs control in a manner that an operation of selecting an object which is present at the position of the viewpoint is executed.

(24) The information processing apparatus of any one of (20) to (23), wherein when the user moves the viewpoint during the predetermined gesture, the operation control unit performs control in a manner that a drag operation is executed in the captured image.

(25) The information processing apparatus of any one of (20) to (24), wherein when the user moves the viewpoint during the predetermined gesture, the operation control unit performs control in a manner that the drag operation is executed in accordance with movement of the viewpoint based on positions of the viewpoint while the viewpoint is being moved.

(26) The information processing apparatus of any one of (20) to (25), wherein when the user moves the viewpoint during the predetermined gesture, the operation control unit performs control in a manner that region selection is executed in accordance with the movement of the viewpoint.

(27) The information processing apparatus of any one of (20) to (26), wherein when the user moves the viewpoint during the predetermined gesture, the operation control unit performs control in a manner that movement of an object is executed in accordance with the movement of the viewpoint.

(28) The information processing apparatus of any one of (20) to (27), further including a viewpoint detection unit configured to detect the viewpoint.

(29) The information processing apparatus of any one of (20) to (28), further including a gesture detection unit configured to detect the predetermined gesture.

(30) The information processing apparatus of any one of (20) to (29), further including an operation execution unit configured to execute an operation based on the captured image in accordance with control performed by the operation control unit.

(31) The information processing apparatus of any one of (20) to (30), wherein the predetermined gesture is a gesture of causing a predetermined operation body to be present in the captured image.

(32) The information processing apparatus of any one of (20) to (31), wherein the predetermined gesture is a gesture of moving a predetermined part of a body of the user.

(33) The information processing apparatus of any one of (20) to (32), wherein the operation control unit judges whether or not the viewpoint is moved based on change of a position of the viewpoint.

(34) The information processing apparatus of any one of (20) to (33), wherein the operation control unit judges whether or not the viewpoint is moved based on a result of detection performed by a sensor worn on a head of the user.

(35) An information processing method including: acquiring a captured image; and controlling an operation based on the captured image depending on whether or not a user moves a viewpoint during a predetermined gesture.

(36) A program for causing a computer to function as an information processing apparatus including: an image acquisition unit configured to acquire a captured image; and an operation control unit configured to control an operation based on the captured image depending on whether or not a user moves a viewpoint during a predetermined gesture.

REFERENCE SIGNS LIST 1 information processing system
10 information processing apparatus
30 captured image
40 (40a, 40b) object
50 (50a, 50b, 50c, 50d) imaging result
60a object
70 (70a, 70b) object
80 (80a, 80b, 80c, 80d, 80x) view
110 control unit
111 image acquisition unit
112 recognition unit
113 output control unit
114 gesture detection unit
115 viewpoint detection unit
116 operation control unit
117 operation execution unit
120 storage unit
130 imaging unit
140 sensor unit
150 output unit

The invention claimed is:
1. An information processing apparatus, comprising:
a first camera configured to capture an image of a plurality of objects in real space;
a storage unit configured to store a plurality of first feature amounts corresponding to the plurality of objects; and
circuitry configured to:
  determine a plurality of second feature amounts corresponding to the plurality of objects, wherein the plurality of second feature amounts is determined based on the captured image;
  recognize the plurality of objects in the real space based on the plurality of first feature amounts and the plurality of second feature amounts;
  control, based on the recognition, a display screen to display a user interface, wherein
    the user interface comprises a plurality of virtual objects,
    a position of each virtual object of the plurality of virtual objects in the display screen corresponds to a position of a respective object of the recognized plurality of objects in the captured image, and
    a posture of each virtual object of the plurality of virtual objects is changeable based on a posture of the respective object of the recognized plurality of objects;
  determine, as a user gesture, a presence of a user object in an input recognition area of the first camera;
  determine a region of interest within the user interface, wherein the region of interest corresponds to a virtual object of the plurality of virtual objects;
  control, based on the determined region of interest, the display screen to display a specific object at a position corresponding to a position of an object of the recognized plurality of objects;
  determine that the region of interest remains same during the presence of the user object in the input recognition area;
  detect, as a termination of the user gesture, an absence of the user object in the input recognition area;
  execute one of a tap operation, a click operation, or a select operation on the specific object based on
    the determination that the region of interest remains same and
    the detected absence of the user object in the input recognition area; and
  control the display screen to display specific information on the specific object, wherein the display of the specific information on the specific object is based on the detected absence of the user object in the input recognition area and the execution of the one of the tap operation, the click operation, or the selection operation, and the specific information includes at least one of a title associated with the specific object or contents associated with the specific object.

2. The information processing apparatus according to claim 1, further comprising a sensor configured to generate data representative of a user viewing direction, wherein
the circuitry is further configured to determine the region of interest within the user interface based on the generated data.

3. The information processing apparatus according to claim 2, wherein the sensor is one of a second camera, an acceleration sensor, or a gyro sensor.

4. The information processing apparatus according to claim 1, wherein
the circuitry is further configured to:
determine a change in the region of interest within the user interface based on the user gesture; and
execute a drag operation on the specific object based on the change of the region of interest.

5. The information processing apparatus according to claim 4, wherein the circuitry is further configured to control, based on the change in the region of interest, a first device to transmit content information to a second device.

6. The information processing apparatus according to claim 5, wherein the first device is a television.

7. The information processing apparatus according to claim 1, wherein the circuitry is further configured to transmit, based on the user gesture, a request to a first device to send determined data to the information processing apparatus.

8. The information processing apparatus according to claim 7, wherein the circuitry is further configured to receive the determined data from the first device based on the request.

9. The information processing apparatus according to claim 7, wherein the circuitry is further configured to receive a discount coupon from the first device based on the request.

10. The information processing apparatus according to claim 1, wherein
the circuitry is further configured to:
determine a change in the region of interest within the user interface based on the user gesture; and
execute a drag operation on the specific object based on an amount of the change of the region of interest.

11. The information processing apparatus according to claim 1, wherein the first camera is further configured to capture an image of the user object.

12. The information processing apparatus according to claim 1, further comprising the display screen, wherein the display screen is in a head-mounted display unit.

13. The information processing apparatus according to claim 1, wherein the circuitry is further configured to determine, as the user gesture, a gesture of movement of a part of an operation body.

14. An information processing system, comprising:
a camera configured to capture an image of a plurality of objects in real space;
a storage unit configured to store a plurality of first feature amounts corresponding to the plurality of objects; and
circuitry configured to:
determine a plurality of second feature amounts corresponding to the plurality of objects, wherein the plurality of second feature amounts is determined based on the captured image;
recognize the plurality of objects in the real space based on the plurality of first feature amounts and the plurality of second feature amounts;
control, based on the recognition, a display screen to display a user interface, wherein
the user interface comprises a plurality of virtual objects,
a position of each virtual object of the plurality of virtual objects in the display screen corresponds to a position of a respective object of the recognized plurality of objects in the captured image, and
a posture of each virtual object of the plurality of virtual objects is changeable based on a posture of the respective object of the recognized plurality of objects;
determine, as a user gesture, a presence of a user object in an input recognition area of the camera;
determine a region of interest within the user interface, wherein the region of interest corresponds to a virtual object of the plurality of virtual objects;
control, based on the determined region of interest, the display screen to display a specific object at a position corresponding to a position of an object of the recognized plurality of objects;
determine that the region of interest remains same during the presence of the user object in the input recognition area;
detect, as a termination of the user gesture, an absence of the user object in the input recognition area;
execute one of a tap operation, a click operation, or a select operation on the specific object based on
the determination that the region of interest remains same and
the detected absence of the user object in the input recognition area; and
control the display screen to display specific information on the specific object, wherein
the display of the specific information on the specific object is based on the detected absence of the user object in the input recognition area and the execution of the one of the tap operation, the click operation, or the selection operation, and
the specific information includes at least one of a title associated with the specific object or contents associated with the specific object.

15. A method, comprising:
capturing, by a camera of an information processing apparatus, an image of a plurality of objects in real space;
storing, in a storage unit of the information processing apparatus, a plurality of first feature amounts corresponding to the plurality of objects;
determining, by circuitry of the information processing apparatus, a plurality of second feature amounts corresponding to the plurality of objects, wherein the plurality of second feature amounts is determined based on the captured image;
recognizing, by the circuitry, the plurality of objects in the real space based on the plurality of first feature amounts and the plurality of second feature amounts;
controlling, by the circuitry, based on the recognition, a display screen to display a user interface, wherein
the user interface comprises a plurality of virtual objects, a position of each virtual object of the plurality of virtual objects in the display screen corresponds to a position of a respective object of the recognized plurality of objects in the captured image, and a posture of each virtual object of the plurality of virtual objects is changeable based on a posture of the respective object of the recognized plurality of objects;

determining, by the circuitry, a presence of a user object in an input recognition area of the camera, as a user gesture;

determining, by the circuitry, a region of interest within the user interface, wherein the region of interest corresponds to a virtual object of the plurality of virtual objects;

controlling, by the circuitry, based on the determined region of interest, the display screen to display a specific object at a position corresponding to a position of an object of the recognized plurality of objects;

determining, by the circuitry, that the region of interest remains same during the presence of the user object in the input recognition area;

detecting, by the circuitry, an absence of the user object in the input recognition area, as a termination of the user gesture;

executing, by the circuitry, one of a tap operation, a click operation, or a select operation on the specific object based on the determination that the region of interest remains same and the detected absence of the user object in the input recognition area; and controlling, by the circuitry, the display screen to display specific information on the specific object, wherein the display of the specific information on the specific object is based on the detected absence of the user object in the input recognition area and the execution of the one of the tap operation, the click operation, or the selection operation, and the specific information includes at least one of a title associated with the specific object or contents associated with the specific object.

16. A non-transitory computer-readable storage medium having stored thereon, computer-executable instructions which when executed by a processor of an information processing apparatus, cause the processor to execute operations, the operations comprising:

controlling a camera of the information processing apparatus to capture an image of a plurality of objects in real space;

controlling a storage unit of the information processing apparatus to store a plurality of first feature amounts corresponding to the plurality of objects;

determining a plurality of second feature amounts corresponding to the plurality of objects, wherein the plurality of second feature amounts is determined based on the captured image;

recognizing the plurality of objects in the real space based on the plurality of first feature amounts and the plurality of second feature amounts;

controlling, based on the recognition, a display screen to display a user interface, wherein the user interface comprises a plurality of virtual objects, a position of each virtual object of the plurality of virtual objects in the display screen corresponds to a position of a respective object of the recognized plurality of objects in the captured image, and a posture of each virtual object of the plurality of virtual objects is changeable based on a posture of the respective object of the recognized plurality of objects;

determining, as a user gesture, a presence of a user object in an input recognition area of the camera;

determining a region of interest within the user interface, wherein the region of interest corresponds to a virtual object of the plurality of virtual objects;

controlling, based on the determined region of interest, the display screen to display a specific object at a position corresponding to a position of an object of the recognized plurality of objects;

determining that the region of interest remains same during the presence of the user object in the input recognition area;

detecting, as a termination of the user gesture, an absence of the user object in the input recognition area;

executing one of a tap operation, a click operation, or a select operation on the specific object based on the determination that the region of interest remains same and the detected absence of the user object in the input recognition area; and controlling the display screen to display specific information on the specific object, wherein the display of the specific information on the specific object is based on the detected absence of the user object in the input recognition area and the execution of the one of the tap operation, the click operation, or the selection operation, and the specific information includes at least one of a title associated with the specific object or contents associated with the specific object.

17. The information processing apparatus according to claim 1, wherein the circuitry is further configured to:

determine a change in the region of interest within the user interface based on the user gesture;

select a specific region of the user interface based on the change in the region of interest;

select the plurality of virtual objects based on the selected specific region;

sort the plurality of virtual objects; and control the display screen to display the sorted plurality of virtual objects.

\* \* \* \* \*